United States Patent Office

3,381,052
Patented Apr. 30, 1968

3,381,052
ISOMERISATION OF OLEFINES
Brian Patrick McGrath, Crowthorne, and Leonard Turner, Woking, England, assignors to The British Petroleum Company Limited, London, England, a corporation of England
No Drawing. Filed Aug. 26, 1965, Ser. No. 482,889
Claims priority, application Great Britain, Sept. 18, 1964, 38,166/64
5 Claims. (Cl. 260—683.2)

ABSTRACT OF THE DISCLOSURE

The process of the present invention comprises contacting a butene feed at elevated temperatures with a catalyst comprising a borofluoro treated alumina.

---

This invention relates to a process for the isomerisation of olefinic hydrocarbons and particularly to the interconversion of lower mono-olefin hydrocarbons such as butenes.

It is to be understood that the term interconversion includes both the conversion of n-butenes to isobutene and the conversion of isobutene to n-butenes.

Fluorinated alumina catalysts are in general known to effect various hydrocarbon conversions, and in co-pending U.S. application Ser. No. 479,000, filed Aug. 11, 1965 it is stated that in order to obtain a high level of selectivity for the interconversion of butenes, the fluorinated alumina catalysts used must satisfy certain criteria. It has been found that not all aluminas give rise to satisfactory catalysts and that only those which have a specified reversible benzene adsorption as hereinafter defined give rise to satisfactory catalysts. Further it has been found that the percentage weight of fluorine retained on the specific aluminas must be within certain limits if satisfactory catalysts are to be obtained.

Apart from fluorinated aluminas, it is also known that aluminas treated with borofluoride ions will in general effect various hydrocarbon conversions.

It has now been found that in order to effect the interconversion of butenes with a high level of selectivity, the borofluoride treated aluminas should satisfy certain criteria.

Accordingly the present invention constitutes a modification of the invention described in U.S. application Ser. No. 479,000, filed Aug. 11, 1965 and provides a process for the interconversion of butenes comprising contacting the butene feed at elevated temperature with a catalyst comprising a borofluoride treated alumina containing 0.5 to 2 percent by weight of the said anion, said alumina having a reversible benzene adsorption as hereinafter defined measured at a benzene pressure of 0.11 mm. of mercury and a temperature of 190° C., of at least 2μ mols. of benzene per gram of alumina. The use of reversible benzene adsorption criteria to assess the suitability of various aluminas for use in the low temperature isomerisation of C₄ and higher paraffinic hydrocarbons is described in pending British patent application No. 42,830/62.

It is to be understood that whenever catalysts are defined or characterised by anion content, the content specified is the theoretical content calculated from the quantity of anion added to the alumina during the preparation of the catalyst.

The reversible benzene adsorption is a measure of acidity, low figures indicating a low acidity. The measurement of the benzene adsorption of an alumina involves contacting the alumina with benzene vapour at a low partial pressure and a fixed temperature and measuring the amount of vapour adsorbed and desorbed. The amount of the benzene adsorbed may vary with the test conditions used, and in particular with the partial pressure of the benzene vapour and the temperature. It is thus necessary to standardise the conditions and for the purpose of the present invention the partial pressure used is 0.11 mm. mercury and the temperature 190° C.

One description of a suitable technique for measurement of benzene adsorption and an apparatus therefor is to be found in a paper by R. C. Pitkethly and A. G. Goble entitled: "The Adsorption of Benzene on Supported Platinum Catalysts" and published in "Actes du Deuxieme Congres Internationale de Catalyse" Paris 1960, vol. 2, at pape 1851. Adsorption at low partial pressure is normally attributable to chemisorption with a relatively small contribution from physical adsorption and the apparatus for measuring it has three principal sections, viz:

(a) a vapour introduction device;
(b) a holder for the solid to be tested;
(c) a vapour detector.

The vapour introduction device has a source of carrier gas, for example nitrogen or hydrogen, a container for the material to be adsorbed and a valve allowing either the gas alone or gas containing very small quantities of the material to be adsorbed to pass over the solid. The holder which contains the catalyst or catalyst support is capable of being held at a constant temperature over a wide temperature range. Gas passing over the catalyst then goes via the sampling valve to the vapour detector which may be a hydrogen flame-ionisation detector. The detector system may have gas chromatographic columns if the relative rates of adsorption of different materials are to be determined or if reaction is likely under the conditions of test and the composition of the reaction product is to be determined. This is not likely to apply to the present invention.

By passing a stream of gas containing material to be adsorbed over the catalyst or catalyst base to be tested and measuring the difference between the amount of material fed to the catalyst or catalyst base and the amount passing to the detector, the amount of material adsorbed can be determined, after a small correction for dead space in the system. If the flow of material is then discontinued and gas alone is passed over the catalyst, the amount of material which can be desorbed can also be determined. The amount desorbed is known as the reversible adsorption; the difference between the amount adsorbed and desorbed is known as the irreversible adsorption.

The carrier gas for the benzene vapour should be inert to alumina and is, preferably, nitrogen.

The aluminas to be tested are desirably given a standard pretreatment to bring them to a standard chemical and physical state and eliminate any effects which could be due, for example, to different water contents. Prolonged heating in an inert atmosphere is preferred, for example heating between 100–800° C. in dry nitrogen for from 1–75 hrs. A particularly preferred pre-treatment is heating at 470° C. for 16 hrs. in dry nitrogen.

Aluminas suitable for use in the present invention have a reversible benzene adsorption of at least 2μ mols. of benzene per gram of alumina under the specified conditions of measurement, preferably the reversible benzene adsorption is at least 3.5μ mols. per gram.

The catalysts used in the process of the present invention should have a borofluoride content of 0.5–2.0% by wt. Catalysts containing more than 2.0% by wt. of the anion gives rise to high proportions of cracked and polymeric products to the detriment of the desired butene isomers. Preferably the proportion of the anions present in the catalyst is 0.8–1.5% by wt.

The catalysts used in the present process may be prepared by slurrying the selected alumina with an aqueous solution of the free fluoro-boric acid or preferably with an aqueous solution of the corresponding ammonium salt. The amount of acid or salt used is calculated to give the required amount of the borofluoride anion in the finished catalyst. The slurries are then dried e.g. at about 110° C. and calcined e.g. at 450° C. in a flow of nitrogen for about 3 hours.

The process of the invention, as mentioned above, is applicable both to the conversion of n-butenes to isobutene and to the conversion of isobutene to n-butenes. Therefore the feed to the process may comprise any butene isomer or mixture of isomers, providing that the mixture is not the equilibrium mixture corresponding to the reaction conditions employed. Preferably the feed will have a low diene content.

The process is effected at elevated temperature and generally temperatures in the range 250°–550° C. will be used. Pressures may be subatmospheric, atmospheric or super-atmospheric, and the GHSV of the feed may be in the range 100 to 10,000 v./v. Preferably the feed olefin is admitted to the reactor in admixture with a diluent gas for example an inert gas such as nitrogen.

The invention is illustrated by the following examples.

Examples 1 to 7

An alumina having a reversible benzene adsorption of 17.6μ moles benzene per gram alumina, measured at a partial pressure of benzene of 0.11 mm. mercury at 190° C. after a pretreatment consisting of heating at 470° C. for 16 hours in dry nitrogen, was treated with ammonium borofluoride to give catalyst containing from 0.5 to 10% by weight of the borofluoride ion $BF_4^-$. The catalysts used in Examples 1 to 5 were active and selective for the conversion of n-butenes to isobutene and Example 7 illustrates the activity for the reverse reaction isobutene to n-butenes. Example 6 is comparative only and shows that reactions other than isomerisation predominated.

In Example 8 which is comparative only the alumina had a reversible benzene adsorption under the previously specified conditions of 0.12 mole/g.

In all the examples, the feed was passed with nitrogen in the mole ratio of 2:1 over the catalyst at a total GHSV of 1500 v./v. at 450° C. and the gaseous products analysed after 1 hour. The results are set out in Table 1 below.

TABLE 1

| Ex. | Percent wt. $BF_4^-$ | Feed | Gaseous Products, percent wt. | | | |
|---|---|---|---|---|---|---|
| | | | Cracked and sat. < $C_4$ | n-Butenes | Isobutene | Polymeric > $C_4$ |
| 1 | 0.5 | 1 | 1.5 | 79.1 | 17.3 | 2.1 |
| 2 | 0.8 | 1 | 3.6 | 59.4 | 33.0 | 4.0 |
| 3 | 1.0 | 1 | 3.8 | 59.6 | 32.0 | 4.7 |
| 4 | 1.5 | 1 | 4.0 | 58.1 | 33.8 | 4.2 |
| 5 | 2.0 | 1 | 18.8 | 43.3 | 30.0 | 8.1 |
| 6 | 10.0 | 1 | 39.4 | 29.3 | 15.8 | 15.5 |
| 7 | 0.8 | 2 | 5.2 | 50.1 | 36.2 | 8.4 |
| 8 | 1.0 | 1 | 0.7 | 97.2 | 2.0 | 0.1 |

Feed 1.—99.0% wt. n-butenes, 0.8% wt. n-butane, 0.2% wt. $C_5$.
Feed 2.—99.2% wt. isobutene, 0.6% wt. n-butenes, 0.1% wt. butadiene.

It will thus be seen that catalysts containing less than 0.5% by wt. $BF_4^-$ will be relatively inactive for butene interconversion whilst with those containing more than 2.0% by wt. $BF_4^-$ selectivity to butene interconversion is relatively low due to excessive side reaction. In the range 0.8–1.5% by wt. $BF_4^-$ high isomerisation activity is coupled with relatively little side reaction.

It will also be noted that the alumina with a benzene adsorption of 0.12μ mole/g. gave an inactive catalyst.

We claim:
1. A process for the interconversion of butenes which comprises contacting the butene feed at elevated temperature with a catalyst comprising a borofluoride treated alumina formed by slurrying an alumina having a reversible benzene adsorption measured at a benzene partial pressure of 0.11 mm. of mercury and a temperature of 190° C. of at least 2μ moles of benzene per gram of alumina, with sufficient of an aqueous solution of fluoroboric acid or its ammonium salt to deposit 0.5 to 2% weight of $BF_4^-$ anion, drying and heating in nitrogen.

2. A process according to claim 1 wherein the proportion of borofluoride present in the catalyst is 0.8–1.5 by wt.

3. A process according to claim 1 wherein the temperature is in the range 250–550° C.

4. A process according to claim 1 wherein the GNSV of the feed is in the range 100–10,000 v./v.

5. A process according to claim 1 wherein isomerisation is effected in the presence of an inert gas.

References Cited

UNITED STATES PATENTS 2,422,884   6/1947   Burgin _____ 260—683.2
3,114,785   12/1963  Hervert et al. _____ 260—683.2

OTHER REFERENCES

Oblad et al.: "Isomerisation of 1- and 2-pentenes," Industrial and Engineering Chemistry, vol. 39, No. 11, pp. 1462–66 (1947).

DELBERT E. GANTZ, *Primary Examiner.*
V. O'KEEFE, *Assistant Examiner.*